May 24, 1949.  I. D. EBY  2,471,026
DEVICE FOR DETERMINING THE DEPTH OF LIQUIDS
Filed Sept. 27, 1945  3 Sheets-Sheet 1
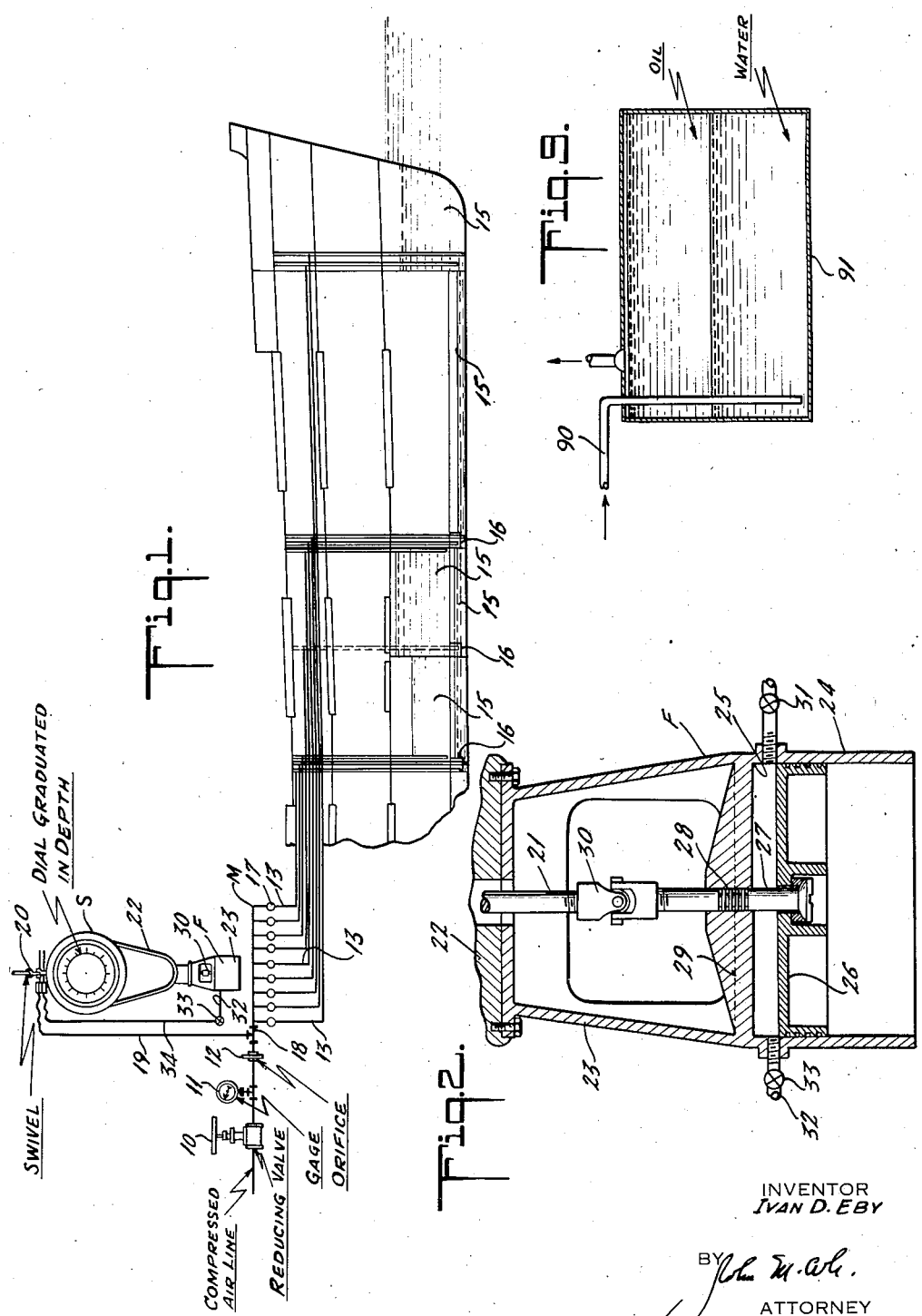
INVENTOR
IVAN D. EBY
BY
ATTORNEY May 24, 1949.  I. D. EBY  2,471,026
DEVICE FOR DETERMINING THE DEPTH OF LIQUIDS
Filed Sept. 27, 1945  3 Sheets-Sheet 2
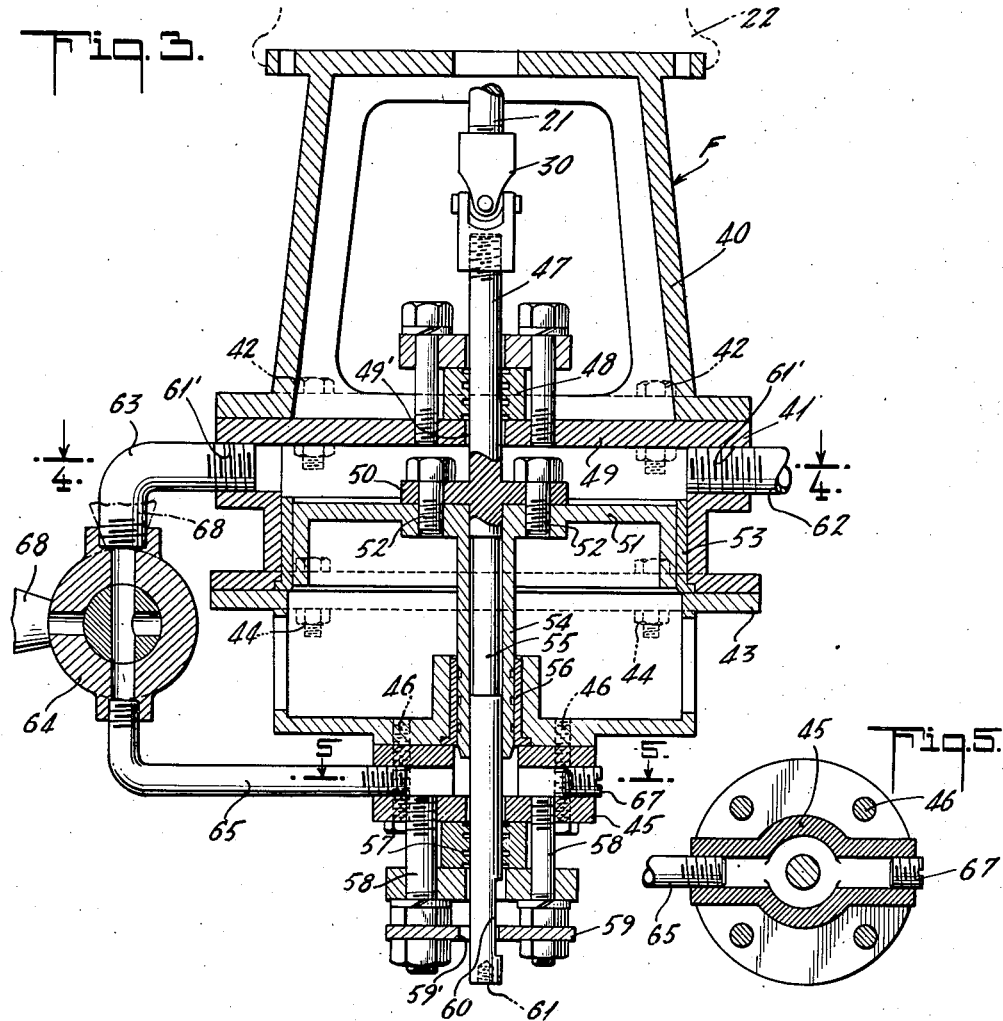
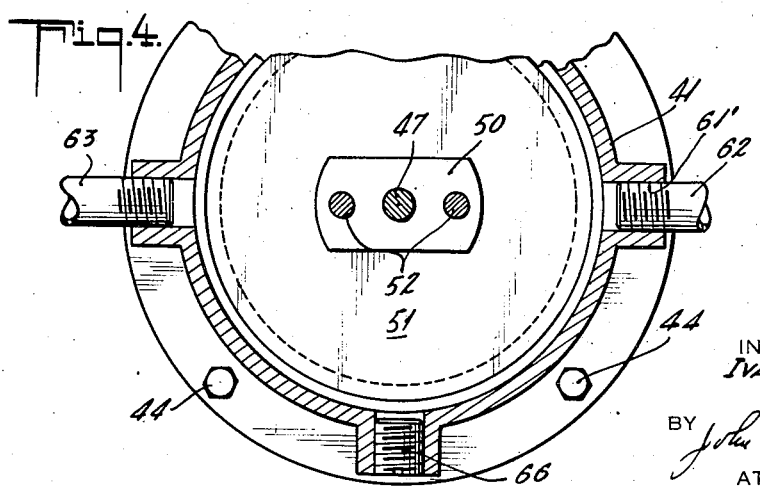
INVENTOR
IVAN D. EBY
BY
ATTORNEY May 24, 1949.   I. D. EBY   2,471,026
DEVICE FOR DETERMINING THE DEPTH OF LIQUIDS
Filed Sept. 27, 1945   3 Sheets-Sheet 3
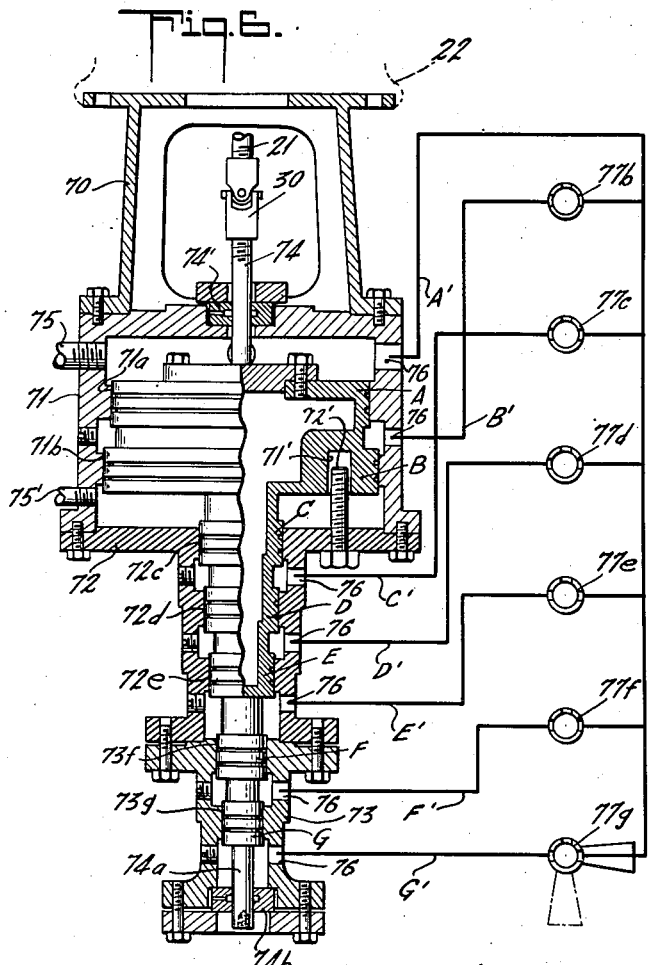
Fig. 6.
Fig. 7.
| AVAILABLE A.P.I. GRAVITIES | STRAIN PISTON "B" | OPPOSED PISTONS |  |  |  |
|---|---|---|---|---|---|
|  |  | C | D | E | F | G |
| 7 |  | • | • | • | • | • |
| WATER 10 |  | • | • | • | • | • |
| 13 |  | • | • | • | • |  |
| 16 |  | • | • | • |  |  |
| 19 |  | • | • |  |  |  |
| 22 |  | • |  |  |  |  |
| 25 | • | • | • | • | • | • |
| 28 | • | • | • | • | • |  |
| 31 | • | • | • | • |  |  |
| 34 | • | • | • |  |  |  |
| 37 | • | • |  |  |  |  |
| 40 | • |  |  |  |  |  |
• INDICATE APPLICATION OF PRESSURE.
BLANKS—INDICATE PISTON ON ATMOSPHERE
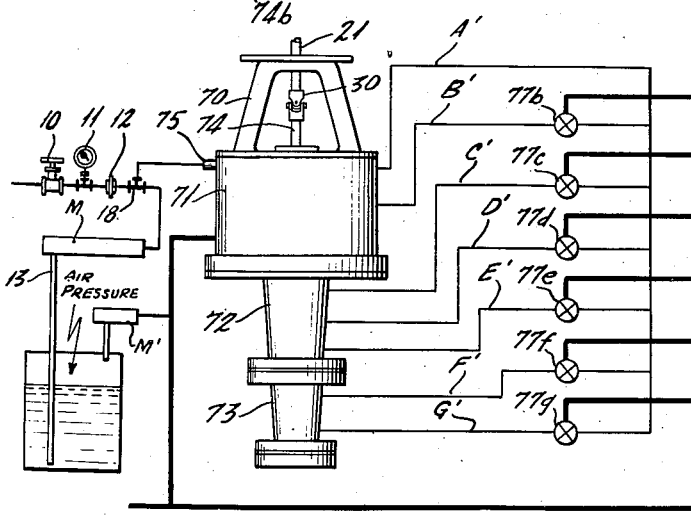
Fig. 8.
INVENTOR
IVAN D. EBY
BY
John M. Cole
ATTORNEY Patented May 24, 1949

2,471,026

UNITED STATES PATENT OFFICE 2,471,026

DEVICE FOR DETERMINING THE DEPTH OF LIQUIDS

Ivan D. Eby, New York, N. Y.

Application September 27, 1945, Serial No. 618,880

7 Claims. (Cl. 73—299)

The present invention relates to devices for determining the depth of liquids, and is more particularly directed toward devices for these purposes and adapted for use on shipboard.

On shipboard liquids are carried in tanks as cargo or as ship's fuel, water is used as ballast, and water and leakage is or may be present in the bilges. It is important at all times to have an accurate record of the depth of the liquid in each and every tank and in each bilge at regular intervals and to be able to ascertain at any time the depth in any particular tank or bilge, and proper records require the making of daily log entries of the soundings. The tanks and bilges are provided with pipes leading to the deck surface or to some other accessible part of the ship, and it has been the practice to make direct measurements by sounding rods lowered into these pipes. Some of these pipes open above deck in locations where they cannot be opened in stormy weather, and the sounding of these lines had to be omitted or postponed until weather conditions made sounding possible. The time required for such determinations was considerable, and, owing to the distance which had to be covered, the quick determination of conditions at remote location was impossible.

The determination of the draft of a ship when away from the dock or riding at anchor is sometimes of great importance, but very difficult as it is impossible to make satisfactory observations of the draft markings. The usual procedure, when the vessel is not alongside a dock, is to take the readings of the draft marks fore and aft from a boat.

The present invention contemplates the equipment of the ship with apparatus whereby all the tanks used for storage of fuel, cargo or ballast, and all bilges may be sounded from a centrally located station on board the ship at any time and under substantially any and all conditions which arise on shipboard, and it further contemplates that the system shall include, wherever desired, means for determining the draft of the ship fore and aft.

In carrying out the present invention a source of compressed air is employed and by means of a system of piping, valves, pressure gauges, and the like, the air is caused to bubble out under the end of a submerged pipe in the tank or bilge to be measured, and the pressure of air is brought to that necessary to maintain such bubbling. This pressure determination is then available to determine the depth of the liquid. The measuring apparatus may be located in the upper engine room or any place convenient for the ship's officers, and the measurements entered in the ship's log.

While the apparatus is more particularly suitable for use on shipboard, it is also possible to apply the same in other locations where the sounding of many tanks is necessary, as in many manufacturing and liquid storing operations.

The accompanying drawings show, for purposes of illustrating the present invention, several embodiments in which the invention may take form, it being understood that the drawings are illustrative of the invention rather than limiting the same.

In these drawings:

Figure 1 is a diagrammatic view illustrating an installation on shipboard;

Figure 2 is a vertical sectional view through a simple form of depth measuring device designed for use with fluids of the same gravity;

Figure 3 is a view similar to Figure 2 of a device for use in gauging depths of fluids of two different gravities;

Figures 4 and 5 are sectional views on the line 4—4 and 5—5 of Figure 3;

Figure 6 is a sectional view through a form of instrument suitable for measuring depths of fluids of widely varying gravities and showing diagrammatically a piping system associated directly with the instrument;

Figure 7 is a tabulation applying to the arrangement shown in Figure 6;

Figure 8 is a diagrammatic view similar to Figure 6 illustrating the instrument of Figure 6 arranged for use where the tanks being gauged are under other than atmospheric pressure; and Figure 9 is a diagrammatic view illustrating a piping arrangement for use in determining the depths of immiscible liquids in a closed container.

Where the device is to be used on shipboard it is connected into the compressed air line usually available there. The pressure of the air is reduced by reducing valve 10 to a pressure indicated by gauge 11 and it is then passed through an orifice 12 which regulates the release of the low pressure air and throttles it to a lower pressure. The air then passes through a manifold M where it is distributed through pipes 13 to various tanks 15—15, bilges 16—16 and the like where depth measurements are to be taken. Only one valve 17 in the manifold is opened at a time so that the air can only go out through one pipe. As the air escapes in the form of bubbles below the surface of the liquid in the tank or bilge, its pressure is brought to an amount which equals the hydrostatic pressure at the depth of immersion of the opening in the pipe. The pressure required for any depth of immersion is, of course, a function of the specific gravity of the liquid.

Between the orifice 12 and the valve 17 of the manifold, the piping system is provided with a T 18 providing a lateral outlet to a hose 19 which leads up to the measuring instrument indicated generally at S. This instrument may conveniently employ much of the mechanism of a weighing scale mounted in such a way as to be plumb or level (according to the type of scale employed) so that it will keep the proper position irrespective of the rolling and pitching of the ship. A butcher's type scale is conveniently hung from swivel links 20, while a scale with a horizontal dial (such as a bathroom scale) is readily mounted on gimbals. The usual weighing mechanism of the scale may be used without change except that the dial usually graduated to show weight, is replaced by a dial graduated to read depths. The load supporting rod 21 extends below the scale frame 22 as usual but does not carry a pan or platform to receive articles to be weighed. The scale frame 22 supports a force applying device indicated generally by the letter F, various forms of which are shown in the drawings.

In the simple form of mechanism indicated diagrammatically in Figure 1 and detailed in Figure 2, the force applying mechanism includes a frame 23 suitably secured to the bottom of the scale frame. The frame 23 has a dependent skirt-like portion 24 forming a cylinder 25 which is adapted to receive a piston 26. The cylinder is co-axial with the load supporting rod 21. The piston 26 is connected to a rod 27 which extends up through an opening 28 in the wall 29 forming the top of the cylinder. The rods 27 and 21 are interconnected by a universal coupling 30. The piston and piston rod are fitted into the frame 23 with a clearance of about .001" so as to move very freely. It is not necessary that they form a tight seal. It is merely necessary to hinder the escape of air. They may be grooved as indicated in the drawings. The upper part of the cylinder is provided with two openings. One is a vent and drain normally closed by a valve 31, while the other is connected by a pipe 32 to a valve 33. A hose 34 extends from the valve 33 up near the mounting 20 and is connected with the hose 19.

The effective area of the piston, i. e. its total area less the area occupied by the connecting rod 27, is determined in accordance with the specific gravity of the liquid whose depth measurement is desired and is correlated with the dial graduations so that the air pressure which exists on top of the piston when bubbles pass out under the surface of the liquid, will be sufficient to actuate the scale mechanism to bring the pointer to the position on the dial having a graduation corresponding with the actual depth of the liquid in the container. Such an instrument is well adapted for measuring the depths of water in bilges or the draft of the ship; or a similar instrument with either the same size piston and different dial calibration, or one with the same dial calibration and piston of different area could be used to sound the depths of tanks carrying oil of uniform gravity. The amount of movement necessary to achieve a full dial reading is very small, a movement in the order of $\frac{1}{16}$" being sufficient when a well known form of weighing scale is used in the device.

The arrangement shown in Figures 3, 4 and 5 is one designed for measuring the depth of bilge water, ship's draft, and the like where such water is one liquid whose depth is desired, and for measuring the depth of oil in tanks where all the oil is of approximately the same gravity. Here the frame of the force applying mechanism includes an adapter 40 secured to the scale frame 22; an upper cylinder 41 secured to the adapter by bolts 42, a coupling 43 secured to the cylinder by bolts 44 and a lower air chest 45 secured to the coupling 43 by bolts 46. The load supporting rod 21 of the scale carries the universal coupling 30 as above described. The universal coupling carries a shaft 47 extending down through a guide block and gland 48 with a clearance of about .0005" and through an oversize hole 49' in the upper wall 49 of the upper cylinder 41. The rod 47 is provided with a flange 50 secured to a piston 51 by cap bolts 52. This piston is received in a sleeve 53 carried in the cylinder.

The piston 51 is provided with a tubular extension 54 through which the lower end 55 of the rod 47 extends. This extension forms a small diameter piston 54 and is carried in a cylinder 56 fitted in the coupling member 43. The lower air chest which is carried by the coupling 43 supports a guide block or gland 57 with similar clearance by means of unlike bolts 58, and these bolts also carry a plate 59 having a non-circular hole 59' through which the non-circular portion 60 of the rod passes to prevent turning of the assemblage carried by the rod. The pistons and cylinders are carefully machined to have a clearance of about .001" and the shaft 47 carefully centered so that this clearance is maintained. The pistons are as free to move as the scale pan of the ordinary weighing scale. A threaded hole 61 is provided to facilitate adding a weight for calibrating the scale.

The upper cylinder 41 is provided with a number of tapped openings 61'. One of these openings is connected by a pipe 62 with the air supply in the same way as described in connection with Figures 1 and 2. Another opening is connected by piping indicated at 63 and three way valve 64 with another pipe 65 which leads into the lower air chest 45. The unused openings 61' are plugged as indicated at 66 and the air chest 45 has a plugged opening indicated at 67.

When the handle 68 of the three way valve is in the position indicated in the drawings, the upper and lower cylinders are connected together. When it is turned to the dotted line position the lower cylinder is disconnected from the upper cylinder and vented.

With the arrangement shown in Figures 3, 4 and 5, the effective area of the upper piston and the graduations on the dial are calculated so that the dial readings will indicate correctly the depth of a liquid lighter than water, for example, an oil of a certain gravity which the ship is carrying in its tanks. When the cylinders are interconnected the force developed against the lower piston is algebraically added to that developed against the upper piston and one obtains this load on the rod 47. The area of piston 54 is such that the scale reading is proper for a heavier gravity liquid, for example, salt water. Thus one can use the same apparatus for gauging the depth of oil tanks, or of bilges which contain salt water. If the apparatus were to be used in ships operating only in fresh water, a corresponding change would be made in the size of the lower piston. It is also, of course, obvious that the upper piston could be arranged to give proper readings for fresh water depths while the lower piston was arranged to take care of the difference between the specific gravity of fresh and salt water.

In the arrangement shown in Figure 6, the adapter 70 carries a body member 71, having two cylindrical bores 71a, 71b to receive pistons A and B. It supports a second body member 72 having three cylindrical bores 72c, 72d and 72e to receive pistons C, D and E. The member 72 carries a lower member 73 having two bores 73f and 73g to receive pistons F and G. The pistons are all coupled together and supported from a stem or rod 74 passing through a guide block or gland 74' and connected to the scale attachment as will be obvious from the drawing and prevented from turning by a stud 72' entering hole 71'. The stationary elements are all bolted together and supported from the scale frame. The stem or rod 74a below the lower piston passes through a guide block or gland 74b.

The cylinder above piston A has an air inlet 75 and below the cylinder B it is provided with a breather 75'. The castings forming the parts 71, 72 and 73 are provided with suitably tapped openings 76 here indicated on the right hand side of the figure. Each of these tapped openings is connected to a pipe, these pipes being indicated by the letters A', B', C', D', E', F' and G', respectively. The pipe A' is connected to three way valves 77b, 77c, 77d, 77e, 77f and 77g, one for each of the other pipes and these valves may be manipulated so as to interconnect the corresponding cylinders in various manners so that different effective piston areas are subjected to the same air pressure as piston A.

Pistons A and B are strain pistons putting load directly on the scale mechanism. They are calculated to provide the proper scale reading for two selected gravities, for example A. P. I. gravity 22 for piston A and A. P. I. gravity 40 for piston B. All the other pistons are opposing pistons. When the valves 77b to g inclusive are all closed, the air pressure received through pipe 75 is received only by piston A and all the other pistons work freely because of the venting effect by the three way valves when in this position and under these conditions the apparatus will properly read depths for oil of 22 gravity. If valve 77b is left closed and one or more of the other valves opened, one can have available the proper opposed piston area to correspond with other selected gravities, for example, gravities of 19 with one opposed piston operating, 16 with two such pistons operating, 13 with three such pistons operating, 10 (water) with four pistons operating and 7 with all five pistons operating. When valve 77b is opened strain piston B becomes effective in the same direction as piston A. When valves 77c to g, inclusive, are successively closed, one can adjust for gravity 25 to gravity 40. In this manner the same instrument can be used to measure the depths of liquids from gravity 7 to gravity 40 with a satisfactory degree of accuracy for the purpose. Figure 7 illustrates a key to these operations. Of course, one can omit any of the pistons and corresponding cylinders which correspond with gravities of liquids for which measurements are not desired and more or less pistons may be employed depending upon the particular uses of the apparatus.

While the present apparatus will usually be used in positions where the tanks or containers of liquids are open to the atmosphere, there are instances in which it is desirable to sound the depth of liquids in tanks which are not open to the atmosphere. Such tanks may be maintained under vacuum or under some super-atmospheric pressure and gases other than air may be employed. In such instances the sounding system will be connected into the piping system so that the same gas will be employed which is over the liquid surfaces and instead of allowing the gas which bubbles up through the liquid to escape, it is piped back into the system and the pistons which are ordinarily open to atmospheric pressure are interconnected to one another and to the system so that they are at the now normal gas pressure employed in the system.

Figure 8 illustrates a sounding apparatus for such a system using compressed air over the liquid in the tanks. It shows the same apparatus which is illustrated in detail in Figure 6 and on this figure is superimposed a piping system shown in heavy lines and indicated by the reference character 80, which connects all the valves 77b to 77g to the breather opening and through a manifold M' to the tops of the tanks under pressure.

Figure 9 indicates the use of the device for determining the proportions of two immiscible liquids such as oil and water in a tank. In certain cases it is necessary to keep a tank full at all times, water being added as oil is withdrawn. Here the measuring apparatus is connected as before to a sounding pipe 90 which meters the tank 91. The depth of the tank is known and if full of oil and the piston is of the proper size for the oil, the dial reading will show the full depth of the tank. Should the tank be full of water instead of oil and the same piston used, the reading will be higher by a constant factor, again depending on the gravity. All readings for the full tank containing some water will be between the two figures, and the location of the surface of the water is readily indicated. From the constants of the tank the actual amount of oil remaining is readily determined.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. A device for use in determining the depth of a liquid of known specific gravity in a remote container and employing a supply of inert gas at a pressure in excess of the total pressure in the liquid at the bottom of the container and means to direct the gas into the bottom of a liquid containing container for release in the form of bubbles so that its pressure equals the total pressure at the point of release, said device comprising a weighing mechanism having a scale graduated in depth of liquid, an indicator, the scale and indicator being relatively movable, a pendant load supporting rod connected to said movable part to actuate it, a tension rod connected to the load supporting rod, a frame fixedly carried by the scale and having an apertured top wall through which the tension rod extends and cylindrical walls concentric with the rods to form a downwardly opening cylinder, a substantially frictionless, substantially gas tight gland carried by the frame about the tension rod, a tension rod supported piston in the cylinder and forming a gas chamber, and a gas conduit connected to the gas directing means and to the side of the cylinder above the piston to supply gas to the chamber at the pressure of the gas directing means, the effective area of the piston being predetermined in accordance with the specific gravity of the liquid so that the scale reading indicates the depth of that liquid above the point of release of the bubbles.

2. A device as in claim 1, having a supplemental cylinder co-axial with the first and a supplemental piston in the supplemental cylinder connected to the first piston to move therewith, conduit means to interconnect the two cylinders so that the same pressure is in each, the effective area of the second piston being predetermined in accordance with the difference in specific gravity of a different, selected liquid, the force developed on said supplemental piston being algebraically added to that developed by the first piston so that the scale reading indicates the depth of the different selected liquid, and means to disconnect the supplemental cylinder and vent it.

3. A device as in claim 1, having a plurality of supplemental cylinders co-axial with the first and a supplemental piston in each supplemental cylinder connected to the first piston to move therewith, means to interconnect a selected number of cylinders so that the same pressure is in each, the effective area of the pistons in the connected cylinders being predetermined in accordance with the difference in specific gravity of a different, selected liquid, the force developed on said supplemental pistons being algebraically added to that developed by the first piston so that the scale reading indicates the depth of the different selected liquid, and means to disconnect all the other supplemental cylinders and vent them.

4. A device for use in determining the depth of a liquid of known specific gravity in a remote container and employing a supply of inert gas at a pressure in excess of the total pressure in the liquid at the bottom of the container and means to direct the gas into the bottom of a liquid containing container for release in the form of bubbles so that its pressure equals the total pressure at the point of release, said device comprising a weighing mechanism having a scale graduated in depth of liquid, an indicator, the scale and indicator being relatively movable, a pendent load supporting rod connected to said movable part to actuate it, a tension rod connected to the load supporting rod, a frame fixedly carried by the scale and having an apertured top wall through which the tension rod extends and cylindrical walls concentric with the rods to form a downwardly opening cylinder, a substantially frictionless, substantially gas tight gland carried by the frame about the tension rod, a tension rod supported piston in the cylinder and forming a gas chamber, and a gas conduit connected to the gas directing means and to the side of the cylinder above the piston to supply gas to the chamber at the pressure of the gas directing means, the effective area of the piston being predetermined in accordance with the specific gravity of the liquid so that the scale reading indicates the depth of that liquid above the point of release of the bubbles, and means to subject the other face of the piston to the same pressure as exists on the surface of the liquid.

5. In a liquid depth determining apparatus in combination, a weighing mechanism having a frame, a downwardly extending weight support and cooperative indicator and scale graduated in depth of liquid, one of said cooperative parts being fixed, the other movable and driven by the weight support, an adapter adapted to be secured to the bottom of the frame and apertured to accommodate the weight support, a cylinder secured to the bottom of the adapter, a piston in the cylinder, a piston rod extending through the top wall of the cylinder for connection to the weight support so that the piston may be supported from the weight support, a substantially frictionless, substantially air-tight gland about the piston rod, and a source of variable air pressure connected into the cylinder above the piston, a vent below the piston, the effective area of the piston being predetermined in accordance with the specific gravity of the liquid whose depth is in question so that the scale reading indicates the depth at which air at the pressure existing in the cylinder, will escape through a submerged aperture.

6. A device for measuring the depth of liquid of known gravity in a container with a pressure on its surface other than atmospheric pressure, comprising a weighing scale having a frame, a pointer movable over a dial which is calibrated to read depth and a pendent load supporting rod whose vertical movement is registered by the pointer, a downwardly opening cylinder secured to the scale frame, the cylinder being co-axial with the rod, the rod extending into the cylinder, a piston in the cylinder and connected to the rod and having a free sliding fit in the cylinder, means to subject the lower surface of the piston to the pressure existing on the surface of the liquid whose depth is being measured, the effective area of the piston being predetermined in accordance with the specific gravity of the liquid so that the scale reading due to an applied air pressure on top of the cylinder corresponds with the depth of the liquid at which air bubbles can be released.

7. An attachment for weighing scales having a frame and a pendent load suspending rod to convert it to a liquid depth measuring device, comprising a dial reading in depth, a scale supported body member having a downwardly opening cylinder and a cylinder closing upper wall provided with a central aperture, and an air supply connection opening into the upper part of the cylinder, a piston freely slidable in the cylinder, the effective area of the piston being predetermined in accordance with the specific gravity of the liquid, and a piston supporting shaft extending through the aperture in the top cylinder wall and connected with the rod whereby the weight of the piston and the apparent load created thereon when air pressure is applied to the upper surface thereof in excess of that applied to its lower surface when the latter pressure equals the pressure on the surface of the liquid whose depth is being measured, whereby the scale reading due to air pressure applied to the top of the piston corresponds with the depth of the liquid at which air bubbles can be released.

IVAN D. EBY.

REFERENCES CITED

The following references are of record in the file of this patent:

UNITED STATES PATENTS

| Number | Name | Date |
| --- | --- | --- |
| 519,235 | Carpenter | May 1, 1894 |
| 1,100,867 | Dexter | June 23, 1914 |
| 1,579,415 | Thomas | Apr. 6, 1926 |
| 2,072,912 | Heydekampf | Mar. 9, 1937 |
| 2,345,464 | De Giers | Mar. 28, 1944 |
| 2,352,935 | Bohannan | July 4, 1944 |